UNITED STATES PATENT OFFICE.

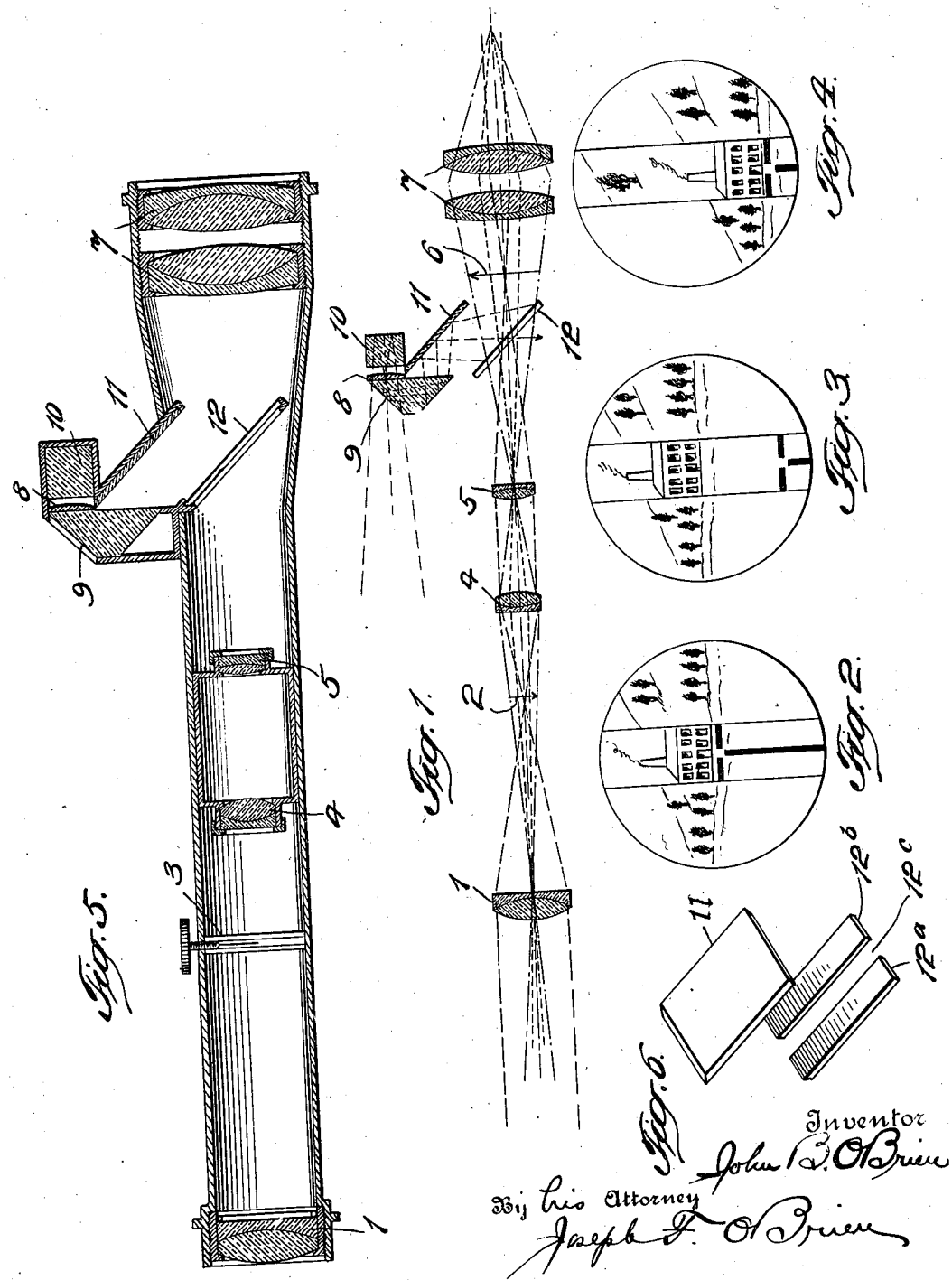

JOHN B. O'BRIEN, OF NEW YORK, N. Y.

TELESCOPE.

1,290,777.      Specification of Letters Patent.      Patented Jan. 7, 1919.

Application filed July 26, 1916. Serial No. 111,372.

*To all whom it may concern:*

Be it known that I, JOHN B. O'BRIEN, a citizen of the United States, and a resident of the borough of Bronx, county of Bronx, and State of New York, have invented certain new and useful Improvements in Telescopes, of which the following is a specification.

This invention relates to improvements in telescopes.

By the use of my invention I am enabled to produce a single-sighting double-field telescope in which a plurality of images of different magnifications of the field of view of the instrument may be produced and viewed simultaneously through a single eye-piece, the image of greater magnification preferably being disposed in a central, vertically-disposed section bounded by two parallel chords extending vertically the entire height of the field of view so as to divide the same into three sections, viz., a central section having an image of relatively high magnification and two segment-shaped sections on opposite sides of and in complementary relationship to said central section and having a divided image of relatively low magnification, whereby a relatively large field of view with a higher magnification of a particular object within that field of view will be produced. An observer or gun pointer will thus be enabled to see with a high magnification the special object or target at which it is desired to aim and may adjust the angle of elevation of his piece in reference to such highly magnified target image, while simultaneously a field of view on opposite sides of the target of much greater extent than would be possible with the target magnification may also be examined.

The invention is illustrated in the accompanying drawings in which—

Figure 1 shows the optical elements of a telescope in accordance with my invention with a target image of relatively high magnification and a divided field image of relatively low magnification;

Fig. 2 illustrates diagrammatically the target and the field images in the field of view of the instrument, the target image showing the cross lines or wires in negative or zero position;

Fig. 3 illustrates the same target and field images with the cross lines or wires adjusted according to angle of elevation of approximately 2000 yards, the telescope and rifle being still held horizontally;

Fig. 4 shows the same target images with the rifle elevated at the proper angle for the range of 2000 yards;

Fig. 5 illustrates my preferred method of mounting the optical elements shown in Fig. 1;

Fig. 6 is a perspective view of the arrangement of the reflectors illustrated in Figs. 1 and 5.

Referring now to these drawings which illustrate a preferred embodiment of my invention, I arrange, in a telescope, optical elements of a relatively high magnification and correspondingly narrow field of view, (which elements I shall hereinafter distinguish by the adjective "target"), in such relationship with other optical elements of relatively low magnification and consequent greater field of view, (which elements I shall hereinafter distinguish by the adjective "field") that pencils of rays of the target and field objectives respectively will pass through a single eye-piece, thus making it possible to view a target image with a high magnification and consequent narrow field limits, while simultaneously viewing a field image of objects contiguous to the target with relatively low magnification and correspondingly wide field limits. As illustrated the target optical elements comprise an objective 1, the inverted image-plane of the objective being indicated by the reference character 2 at which point I place movable cross-wires or lines 3; 4 and 5 indicate image-erecting lenses, the image plane of the erected image being indicated at 6 and the eye-piece which, as shown, is a double lens is indicated by the reference character 7. The field elements comprise an objective 8, erecting prisms 9 and 10, and a system of reflectors indicated by the numerals 11 and 12, the lower reflector 12 of the reflector system being composed, as shown in Fig. 6, of two mirror-sections $12^a$—$12^b$ separated or spaced from each other as indicated at $12^c$ and arranged within the barrel of the target telescope so as to intersect the pencils of rays of the target objective and to permit the passage of rays from the target objective through the strip, space or slot $12^c$, said space or slot being of predetermined width and limiting the width of the image produced by such target objective. As shown, the erected image of both the field objective and of the target objective will be produced at 6 in substantially the same plane and both images may be observed simultaneously through the eye-piece 7.

Obviously in place of the mirrors 11 and 12 a system of prisms for diverting the pencils of rays of the field telescope to the common eye-piece may be employed to equal advantage.

In mounting mirror sections 12ª—12ᵇ of the oblong shape illustrated herein within the barrel of the telescope, it will of course be necessary to provide a segment shaped frame at opposite sides so as to block the light which would otherwise pass between the opposite edges of such mirrors and the barrel of the telescope.

Having described my invention, I claim:

1. The combination with a target objective, an eye-piece coacting with said target objective to produce a target image of relatively high magnification, an erecting system between said eye-piece and objective, a field objective, an optical element intersecting the pencils of rays of the target objective having an aperture arranged to pass rays of said target objective and surfaces at opposite sides of said aperture for diverting rays of the field objective to said eye piece, and optical means for erecting the image of said field objective and transmitting the same to said optical element.

2. The combination with a target objective, an eye-piece coacting with said target objective to produce a target image of relatively high magnification, an erecting system between said eye-piece and objective, a field objective, an optical element intersecting the pencils of rays of the target objective having a vertically-disposed strip of predetermined width arranged to pass rays of said target objective and surfaces at opposite sides of said aperture for diverting rays of the field objective to said eye piece, and optical means for erecting the image of said field objective and transmitting the same to said optical element.

In witness whereof, I have signed my name to the foregoing specification in the presence of two subscribing witnesses.

JOHN B. O'BRIEN.

Witnesses:
HELEN V. WHIDDEN,
FRED P. RANDOLPH.